United States Patent
Zerbe et al.

(10) Patent No.: US 8,362,642 B2
(45) Date of Patent: Jan. 29, 2013

(54) OPTIMIZED POWER SUPPLY FOR AN ELECTRONIC SYSTEM

(75) Inventors: Jared LeVan Zerbe, Woodside, CA (US); Jaeha Kim, Mountain View, CA (US); Yohan U. Frans, Sunnyvale, CA (US); Huy M. Nguyen, San Jose, CA (US)

(73) Assignee: Rambus Inc., Sunnyvale, CA (US)

( * ) Notice: Subject to any disclaimer, the term of this patent is extended or adjusted under 35 U.S.C. 154(b) by 697 days.

(21) Appl. No.: 12/528,566

(22) PCT Filed: Feb. 28, 2008

(86) PCT No.: PCT/US2008/055294
§ 371 (c)(1), (2), (4) Date: Aug. 25, 2009

(87) PCT Pub. No.: WO2008/109341
PCT Pub. Date: Sep. 12, 2008

(65) Prior Publication Data
US 2010/0019834 A1    Jan. 28, 2010

Related U.S. Application Data

(60) Provisional application No. 60/892,506, filed on Mar. 1, 2007.

(51) Int. Cl.
  *H02J 1/10* (2006.01)
(52) U.S. Cl. ........................................................ 307/43
(58) Field of Classification Search ............... 307/43
  See application file for complete search history.

(56) References Cited

U.S. PATENT DOCUMENTS

| | | | |
|---|---|---|---|
| 6,937,059 B2 * | 8/2005 | Satou et al. ................. | 326/30 |
| 7,397,848 B2 * | 7/2008 | Stojanovic et al. ........ | 375/229 |
| 7,523,373 B2 * | 4/2009 | Russell et al. ............. | 714/745 |
| 7,529,951 B2 * | 5/2009 | Schnepper ................. | 713/300 |
| 2004/0027153 A1 | 2/2004 | Satou et al. | |
| 2004/0070420 A1 | 4/2004 | Satou et al. | |
| 2004/0203559 A1 | 10/2004 | Stojanovic et al. ........ | 455/403 |
| 2005/0210346 A1 | 9/2005 | Comashi et al. ............ | 714/724 |
| 2006/0129853 A1 | 6/2006 | Schnepper ................. | 713/300 |
| 2008/0082873 A1 | 4/2008 | Russell et al. ............. | 714/721 |

OTHER PUBLICATIONS

International Search Report and Written Opinion issued in PCT/US2008/055294, Nov. 13, 2008, 16 pages by ISA/EP.
Rambus Inc., Office Action, Chinese Patent Application 200880012901.5, Dec. 1, 2011, 9 pgs.
Rambus Inc., Response to Office Action, Chinese Patent Application 200880012901.5, Feb. 17, 2012, 10 pgs.
Rambus Inc., Board Decision, Chinese Patent Application 200880012901.5, May 31, 2012, 1 pg.
Rambus Inc., Request for Reexamination, Chinese Patent Application 200880012901.5, May 14, 2012, 8 pgs.
Rambus Inc., Board Decision in Chinese Application No. 200880012901.5, dated Mar. 31, 2012, 8 pages.

* cited by examiner

*Primary Examiner* — Hal Kaplan
(74) *Attorney, Agent, or Firm* — Morgan, Lewis & Bockius LLP

(57) ABSTRACT

A method of adjusting a voltage supply to an electronic device coupled to a wired communication link in accordance with a performance metric associated with the wired communication link. A voltage adjust signal is generated based on the performance metric. The voltage adjustment signal is then used for updating the voltage supply to the electronic device.

26 Claims, 11 Drawing Sheets

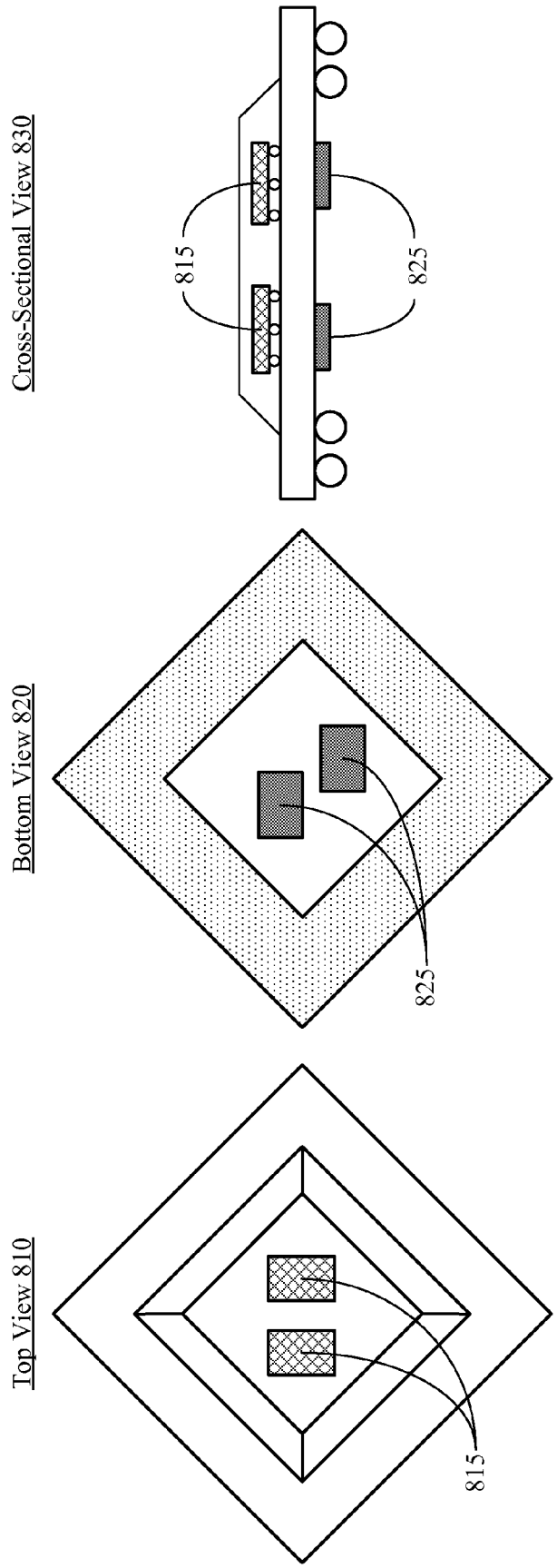

OPTIMIZED POWER SUPPLY FOR AN ELECTRONIC SYSTEM

CROSS REFERENCE TO RELATED APPLICATIONS

This application is a United States National Stage Application filed under 35 U.S.C. §371 of PCT Patent Application Ser. No. PCT/US2008/055294 filed on Feb. 28, 2008, which claims the benefit of and priority to U.S. Provisional Patent Application Ser. No. 60/892,506 filed on Mar. 1, 2007, the disclosures of all of which are hereby incorporated by reference in their entirety.

FIELD

The subject matter disclosed herein relates generally to circuits for use in integrated circuits, and in particular, to circuits and associated methods for optimizing an electronic device's power supply.

BACKGROUND

An electronic system usually includes multiple electronic devices. Different devices are configured to perform different operations. At one given moment, some devices may operate at a high speed and therefore consume more power than some other devices that are in a sleep mode. Similarly, a specific device may perform more operations at one moment and therefore burn more energy than it does at a different moment. Other factors such as manufacturing process variations, environmental temperature variations, or even aging differences between device components may also result in a variation of power consumption for different devices at the same moment and for the same device at different moments. As a result, both the system and an individual device may have a dynamic power supply requirement.

On the other hand, it is quite common that various devices in a conventional electronic system are powered by very few or just a single static power supply. In this case, to ensure that the entire system operates appropriately even under worst scenario, many devices consume more power than necessary. Additionally, manufacturing or temperature variations can result in device performance which far exceeds the requirements of the system. In such cases the power supply could be reduced and the devices would still be able to meet system performance needs while consuming less power.

This power wasting problem is further complicated for a system-in-package (SIP) configuration. SIP has the benefit of providing low-cost interconnects between semiconductor chips within the same package. But the increased power density associated with the unnecessary power consumption may cause a device or system overheat, which severely limits the number of chips that can be assembled into a single package.

Therefore, there is a need for optimizing an electronic device's power supply without the aforementioned problems.

SUMMARY

A method for dynamically controlling an electronic system's one or more voltage supplies and related circuits is described.

In some embodiments, the electronic system includes a first electronic device, a second electronic device, one or more wired communication links coupling the first electronic device to the second electronic device, and a voltage regulator integrated into the first electronic device. The voltage regulator is configured to determine a performance metric in accordance with signals received by the first electronic device via the wired communication links, and to adjust a first voltage supply to the first electronic device in accordance with the performance metric.

In some embodiments, a multiple-die electronic package includes a first die, a second die, one or more wired communication links coupling the first die to the second die, and a voltage regulator coupled to the first and second dies. The voltage regulator is configured to adjust one or more of first and second voltage supplies to the first and second dies, respectively, in accordance with a voltage-adjustment signal from the second die.

In some embodiments, a multiple-die electronic package includes a first die, a second die, one or more wired communication links coupling the first die to the second die, and a voltage regulator coupled to the first die to supply a first voltage supply and to the second die to provide a second voltage supply. The voltage regulator is configured to adjust the first voltage supply in accordance with a voltage-adjustment signal from the second die.

In some embodiments, a multiple-die electronic package includes a first die, a second die, one or more wired communication links coupling the first die to the second die, and a voltage regulator coupled to the first die to supply a first set of voltage supplies and to the second die to provide a second set of voltage supplies. The voltage regulator is configured to adjust at least one voltage supply of the first set of voltage supplies in accordance with a first voltage-adjustment signal from the first die and to adjust at least one voltage supply of the second set of voltage supplies in accordance with a second voltage-adjustment signal from the second die.

In some embodiments, an integrated circuit fabricated on a semiconductor substrate is configured to regulate a threshold voltage of the transistor devices. The circuit includes a well (e.g., a P-well or N-well), multiple transistors having a back bias node that includes the well, and a threshold adjustment circuit for adjusting the back bias of the multiple transistors.

In some embodiments, a method of adjusting a plurality of voltage supplies for an electronic system includes: repeatedly adjusting a first voltage supply of the plurality of voltage supplies until a first performance metric of the electronic system fails a first predefined requirement; rolling back the first voltage supply to a level such that the first performance metric meets the first predefined requirement; repeatedly adjusting a second voltage supply of the plurality of voltage supplies until a second performance metric of the electronic system fails a second predefined requirement; and rolling back the second voltage supply to a level such that the level of the first voltage supply second performance metric meets the second predefined requirement.

In some embodiments, a method of adjusting a plurality of voltage supplies for an electronic system includes: assigning a respective value to each of the plurality of voltage supplies; adjusting at least two of the plurality of voltage supplies to produce a set of voltage supplies; determining whether the set of voltage supplies satisfies a predefined requirement with respect to a first performance metric of the electronic system; repeating the adjusting and determining operations; selecting a respective set of voltage supplies that satisfy the predefined requirement; and operating the electronic system using the selected set of voltage supplies.

BRIEF DESCRIPTION OF THE DRAWINGS

For a better understanding, reference should be made to the following detailed description taken in conjunction with the accompanying drawings, in which:

FIGS. 8A-8C are block diagrams illustrating different views of an embodiment of two voltage regulators mounted on the bottom surface of an electronic package.

Like reference numerals refer to corresponding parts throughout the drawings.

DETAILED DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 1:
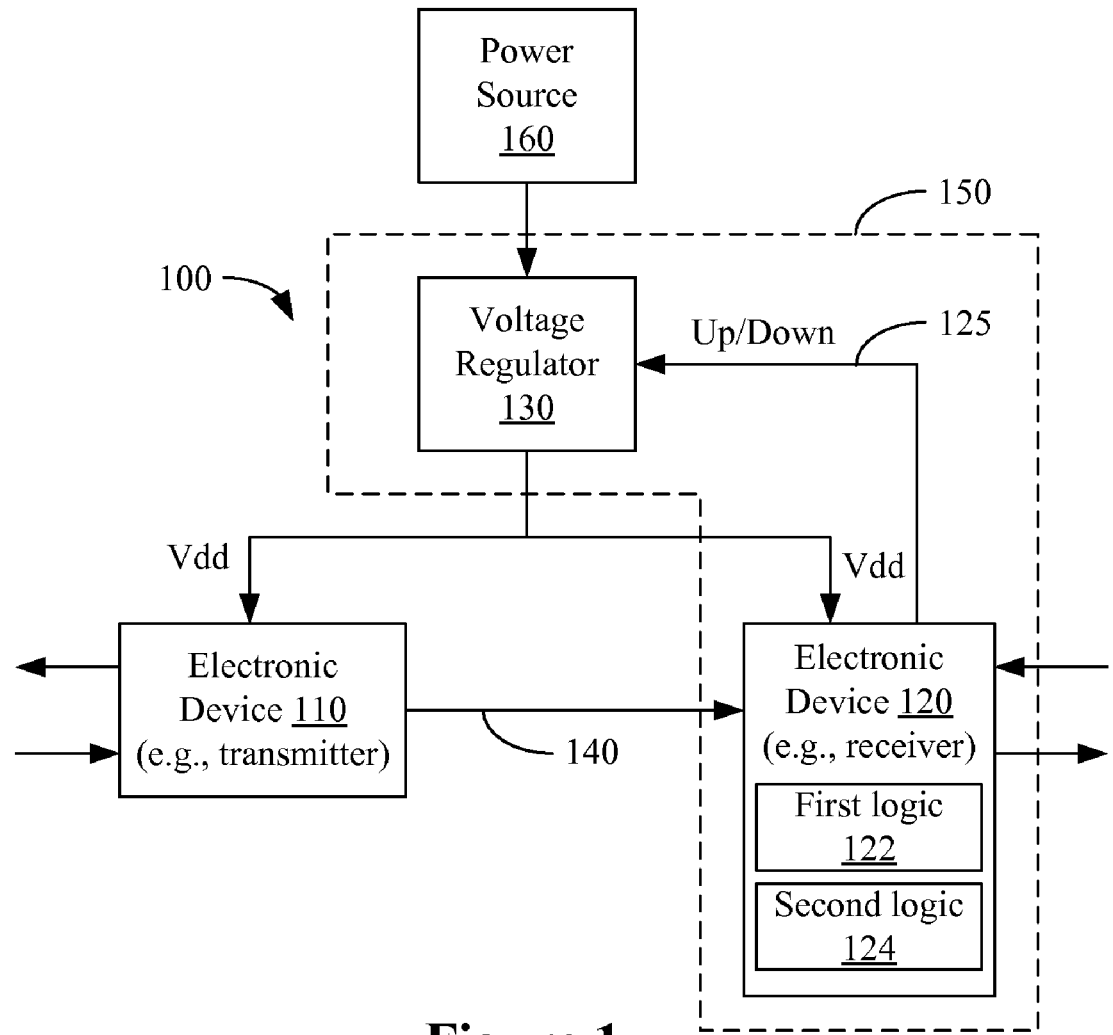
FIG. 1 is a block diagram illustrating an embodiment of a system including a voltage regulator adjusting a voltage supply to two electronic devices interconnected by a wired communication link.

FIG. 1 is a block diagram illustrating an embodiment of a system 100 including a voltage regulator 130 adjusting a voltage supply Vdd to two electronic devices 110, 120 interconnected by a wired communication link 140. In some embodiments, the electronic device 110 is a transmitter and the electronic device 120 is a receiver. In some embodiments, the voltage regulator 130 and the two electronic devices 110, 120 are fabricated on three separate dies and the three dies are within a single housing, forming an SIP system. In some other embodiments, the three dies are packaged separately. In some embodiments two of the three components are contained within the same package. For example, the voltage regulator 130 and one electronic device 120 are within one package 150 and the other device 110 is within another package. In some other embodiments, the voltage regulator 130 is integrated onto the die of either of the two electronic devices 110 and 120.

In some embodiments, a power source 160 feeds a voltage supply to the voltage regulator 130. The voltage regulator 130 dynamically adjusts (e.g., increases or decreases) the voltage supply Vdd in accordance with a voltage control signal Up/Down it receives from electronic device 120 along path 125. The adjusted voltage supply Vdd is used for powering the two electronic devices 110, 120.

In some embodiments, the voltage control signal Up/Down is a function of a specific performance metric associated with the electronic device 120. As will be described below in connection with FIGS. 5A and 5B, the performance metric may be dependent upon one or more parameters, such as voltage margin 566, timing margin 565, bit error rate, and/or a matched critical path delay error, etc. The electronic device 120 or a sub-device (not shown) in the electronic device 120 compares the performance metric with a threshold value. If the performance metric is lower than a first threshold value, the current voltage supply Vdd is deemed to be lower than necessary to power the two electronic devices. Accordingly, the electronic device 120 or the sub-device transmits one or more voltage Up signals to the voltage regulator 130 via a wired communication link 125. The voltage regulator 130 then increases the voltage supply Vdd to the two electronic devices until the performance metric matches the first threshold value. In this context, the performance metric may "match" a threshold value either when the two are equal, or when the performance metric falls within a predefined range of the threshold value.

Similarly, if the performance metric is higher than a second threshold value, the current voltage supply Vdd is deemed to be higher than necessary. In this case, the electronic device 120 or the sub-device transmits one or more voltage Down signals to the voltage regulator 130. The voltage regulator 130 then decreases the voltage supply Vdd until the performance metric matches the second threshold value. Once again, the performance metric may "match" the second threshold value either when the two are equal, or when the performance metric falls within a predefined range of the second threshold value. The first and second threshold values may be the same or different. In such a manner the electronic device 120 and the voltage regulator 130 provide a closed-loop system where the characteristic of Vdd will exhibit "locking" and "dither" behaviors.

In some embodiments, the electronic device 120 includes first logic 122 and second logic 124. The first logic 122 is configured to generate a first sub-signal for a first type of circuit (e.g., digital circuit) in the electronic device 120. The second logic 124 is configured to generate a second sub-signal for a second type of circuit (e.g., analog circuit) in the electronic device 120. In this case, the voltage-adjustment signal is a function of the first and second sub-signals.

In some embodiments, the voltage-adjustment signal is a voltage-increasing signal if any of the first and second sub-signals is a voltage-increasing signal. The voltage-adjustment signal is a voltage-decreasing signal if the first and second sub-signals are both voltage-decreasing signals.

In some embodiments, the first logic 122 is configured to generate a voltage-increasing signal if the electronic device 120 has a critical path delay above a predefined delay threshold.

In some embodiments, the second logic 124 is configured to generate a voltage-increasing signal if the electronic device 120 has a voltage margin below a predefined voltage margin threshold. In some embodiments, the second logic 124 is configured to generate a voltage-increasing signal if the electronic device 120 has a timing margin below a predefined timing margin threshold. In some embodiments, the second logic 124 is configured to generate a voltage-increasing signal if the second electronic device 120 has a bit error rate above a predefined bit error rate threshold. The second logic 124, may include bit error rate measurement circuitry, or alternately the second logic 124 may be coupled to bit error rate measurement circuitry (e.g., an adaptive or roaming sampler with BER measurement circuitry or logic) associated with the data stream received by electronic device 120 from wired communication link 140.

Figure 2:
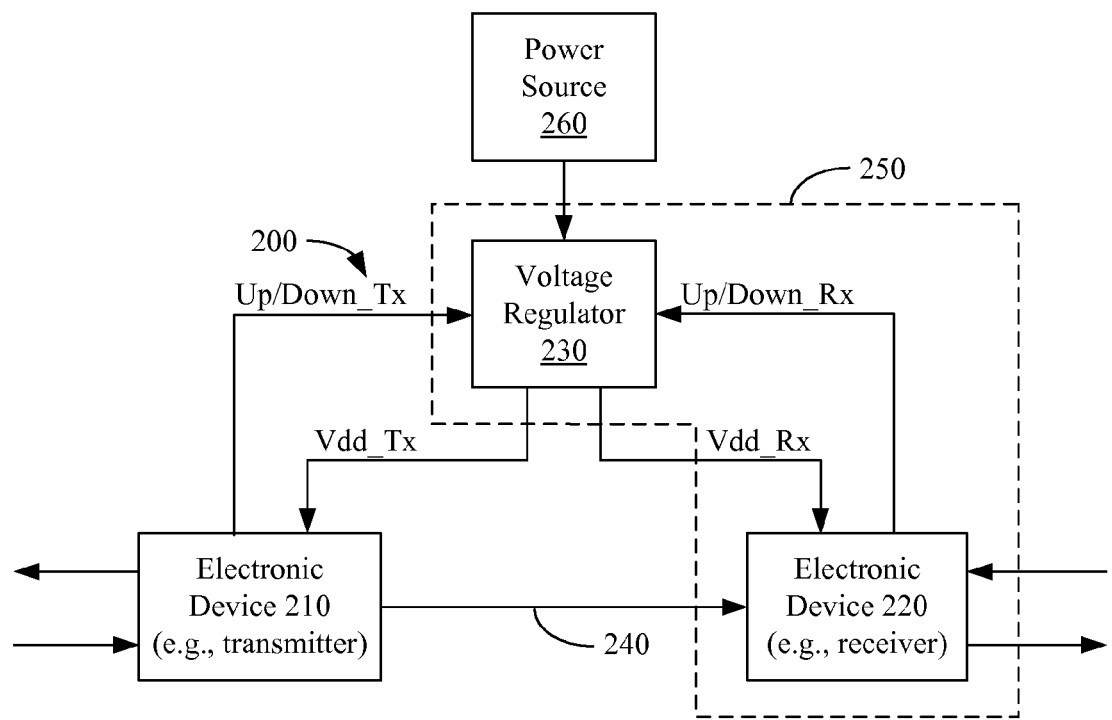
FIG. 2 is a block diagram illustrating an embodiment of a system including a voltage regulator adjusting a voltage supply to each of two electronic devices interconnected by a wired communication link.

FIG. 2 is a block diagram illustrating an embodiment of a system 200 including a voltage regulator 230 adjusting a voltage supply Vdd_Tx to one electronic device 210 and another voltage supply Vdd_Rx to another electronic device 220 coupled to the electronic device 210 by a wired communication link 240. In some embodiments, the electronic device 210 is a transmitter and the electronic device 220 is a receiver. In some embodiments the voltage regulator 230 may be combined on the same die as electronic device 210 or electronic device 220. In some embodiments, the voltage regulator 230 and the two electronic devices 210, 220 are fabricated on three separate dies and the three dies are within a single housing, forming an SIP system. In some other embodiments, the three dies are packaged separately. For example, the voltage regulator 230 and one electronic device 220 are within one package 250 and the other device 210 is within another package. In some other embodiments, the voltage regulator 230 is integrated onto the die of either of the two electronic devices 220 and 230.

In some embodiments, a power source 260 feeds a voltage supply to the voltage regulator 230. The voltage regulator 230 dynamically adjusts (e.g., increases or decreases) the voltage supplies Vdd_Tx and Vdd_Rx in accordance with the voltage control signals Up/Down_Tx and Up/Down_Rx from the electronic devices 210 and 220. The adjusted voltage supplies Vdd_Tx and Vdd_Rx are used for powering the two electronic devices 210, 220, respectively.

In some embodiments, the voltage control signal Up/Down_Tx is a function of a specific performance metric associated with the electronic device 210 and the voltage control signal Up/Down_Rx is a function of a specific performance metric associated with the electronic device 220. The two performance metrics may or may not be the same.

Different algorithms can be implemented at the voltage regulator 230 to adjust one or both of the voltage supplies Vdd_Tx and Vdd_Rx based on one or both of the voltage control signals Up/Down_Tx and Up/Down_Rx. For example, the voltage regulator 230 may increase both the voltage supplies Vdd_Tx and Vdd_Rx when it receives at least one voltage control signal Up_Tx from the electronic device 210 or Up_Rx from the electronic device 220. In another example, the voltage regulator 230 only decreases both the voltage supplies Vdd_Tx and Vdd_Rx when it receives both the voltage control signal Down_Tx from the electronic device 210 and the voltage control signal Down_Rx from the electronic device 220. The same or different magnitudes of voltage supply changes may be applied to Vdd_Tx and Vdd_Rx, respectively, for a given set of voltage control signals Up/Down_Tx and Up/Down_Rx.

Figure 3:
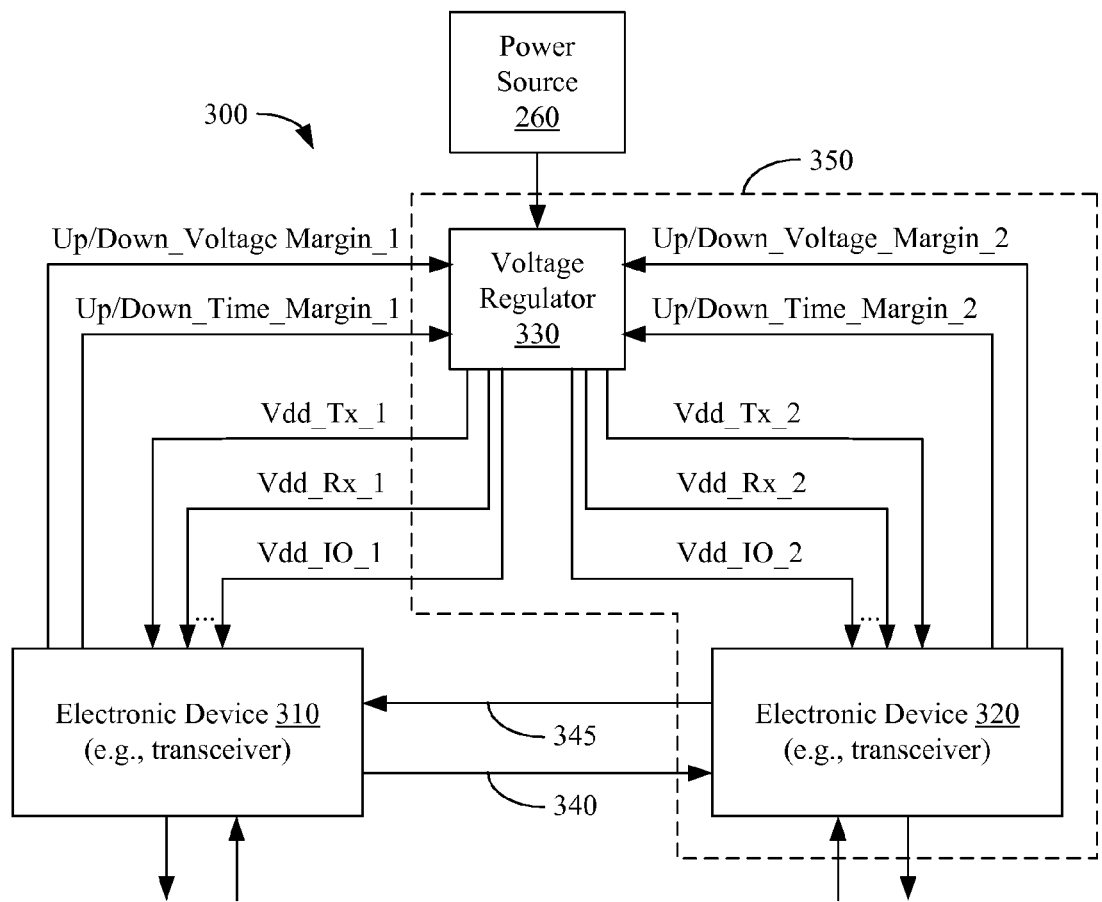
FIG. 3 is a generalized block diagram illustrating an embodiment of a system including a voltage regulator adjusting multiple voltage supplies to each of two electronic devices interconnected by one or more wired communication links.

FIG. 3 is a generalized block diagram illustrating an embodiment of a system 300 having a voltage regulator 330 adjusting multiple voltage supplies to each of two electronic devices 310, 320 interconnected by one or more wired communication links 340, 345. In some embodiments, either or both of the two electronic devices 310, 320 are transceivers. In some embodiments, the voltage regulator 330 and the two electronic devices 310, 320 are fabricated on different dies and the three dies are within a single housing, forming an SIP system. In some other embodiments, the three dies are packaged separately. For example, the voltage regulator 330 and one electronic device 320 are within one package 350 and the other device 310 is within another package. In some other embodiments, the voltage regulator 330 is integrated onto the die of either of the two electronic devices 310 and 320.

In some embodiments, the voltage regulator 330 receives multiple voltage control signals from a respective electronic device. Different voltage control signals may be associated with different performance metrics measured at the electronic device. For example, the voltage control Up/Down_Time_Margin_2 in FIG. 3 is associated with the timing margin measured at the electronic device 320 and the Up/Down Voltage_Margin_1 is associated with the voltage margin measured at the electronic device 310.

In some embodiments, the voltage regulator 330 generates multiple voltage supplies for one or both of the electronic devices 310, 320 based on the voltage control signals it receives from the electronic devices. As shown in FIG. 3, the voltage regulator 330 applies three voltage supplies Vdd_Tx_1, Vdd_Rx_1, and Vdd_IO_1 to the electronic device 310. The voltage supply Vdd_Tx_1 is to power a transmitting sub-device (not shown) of the electronic device 310. The voltage supply Vdd_Rx_1 is to power a receiving sub-device (not shown) of the electronic device 310. The voltage supply Vdd_IO_1 (an input/output circuitry voltage supply) is to power an I/O interface (not shown) of the electronic device 310.

Besides the exemplary voltage adjustment algorithms described above in connection with FIGS. 1-3, it will be apparent to one skilled in the art that many other voltage supply adjustment algorithms may be employed to generate the multiple voltage supplies based on multiple voltage control signals collected from the respective electronic devices.

In sum, a voltage regulator is embedded in a system to provide voltage supplies to one or more semiconductor chips coupled to the voltage regulator. At least one of the semiconductor chips is configured to generate one or more voltage control signals. In some embodiments, a voltage control signal is generated by comparing a performance metric measured at the semiconductor chip with a threshold value.

If the performance metric differs from the threshold value in a first direction (e.g., higher than the threshold value), one or more voltage supplies currently generated by the voltage regulator are deemed to be higher than necessary. It is possible to decrease the voltage supplies and therefore reduce the system's power consumption without adversely affecting the system's performance. Accordingly, one or more voltage control signals are used for decreasing repeatedly, if necessary, the voltage supplies by a predefined amount until the performance metric matches the threshold value. As noted above, the performance metric may match the threshold value either when the two are equal, or when the performance metric falls within a predefined range of the threshold value.

If the performance metric differs from the threshold value in a second direction (e.g., lower than the threshold value), one or more voltage supplies currently generated by the voltage regulator are deemed to be lower than what is required to maintain the system's performance. Accordingly, one or more voltage control signals are used for increasing repeatedly, if necessary, the voltage supplies by a predefined amount until the performance metric matches the threshold value.

In some embodiments, the voltage regulator adjusts an electronic device's voltage supply when the device operates in an initialization mode, e.g., when the device is powered up.

In some other embodiments, the voltage regulator adjusts an electronic device's voltage supply even if the device operates in a post-initialization mode, e.g., by monitoring a performance metric corresponding to the temperature of a device in the system. In these embodiments, the voltage regulator 130, 230, 330 or 430 includes a temperature sensor (not shown), or is coupled to a temperature sensor (not shown) external to the voltage regulator, or monitors a circuit parameter (e.g., a current or voltage in the voltage regulator or in one of the electronic devices 110/120, 210/220, 310/320 or 410/420) that is indicative of the temperature of a device in the system.

In some embodiments, a hardware, software or firmware interface is provided for externally adjusting one or more threshold values associated with different devices embedded in the system and therefore the devices' performance targets and power supply requirements.

In some embodiments, the voltage regulator can be used to adjust voltage supplies to electronic devices within different packages.

Figure 4:
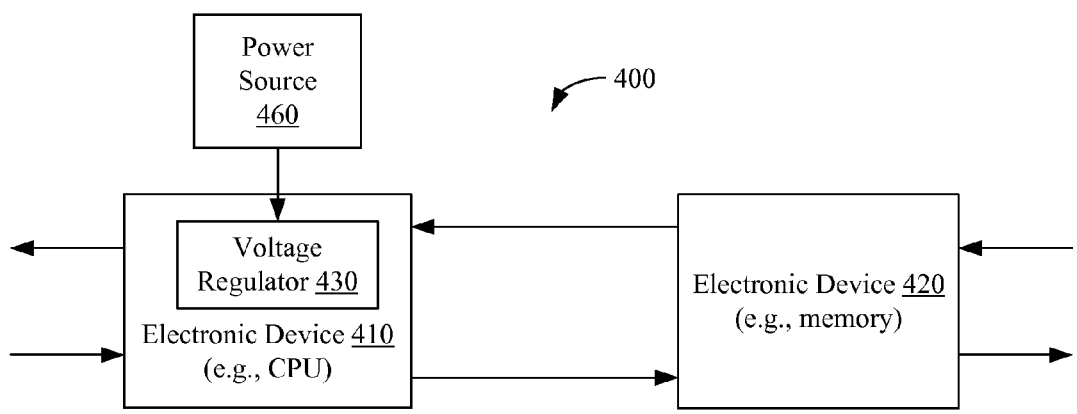
FIG. 4 is a block diagram illustrating an embodiment of an electronic device having an embedded voltage regulator adjusting a voltage supply to the electronic device that is coupled to another device by a wired communication link.

FIG. 4 is a block diagram illustrating an embodiment of a system 400 including an electronic device 410 having an embedded voltage regulator 430 adjusting a voltage supply to the electronic device 410. In some embodiments, the electronic device 410 is a central processing unit (CPU) and the electronic device 420 is a memory device.

In some embodiments, a power source 460 feeds a voltage supply to the voltage regulator 430. The voltage regulator 430 dynamically adjusts (e.g., increases or decreases) the voltage supply to the electronic device 410 in accordance with a performance metric associated with the device (e.g., voltage margin, timing margin, bit error rate, and/or critical path delay error).

In some embodiments, the voltage regulator 430 also receives information associated with the current performance of the two devices 410 and 420.

It will be apparent to one skilled in the art that the aforementioned voltage supply adjustment algorithms may be employed by the voltage regulator 430 to update the voltage supply to the electronic device 410.

Figure 5A:
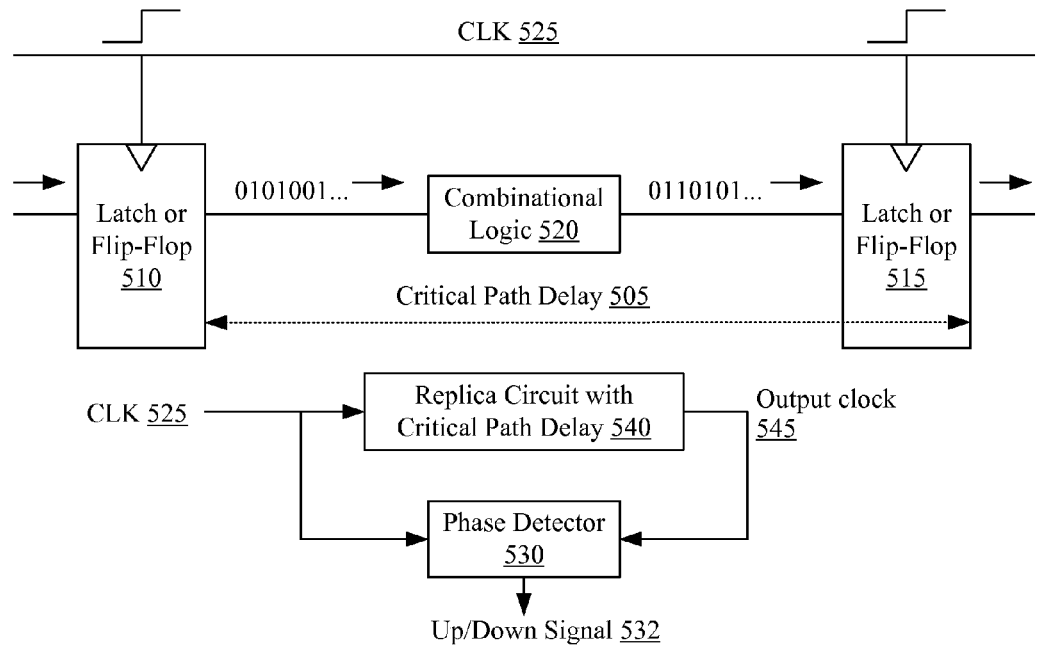
FIG. 5A is a block diagram illustrating an embodiment of detecting a critical path delay error of an electronic device.
Figure 5B:
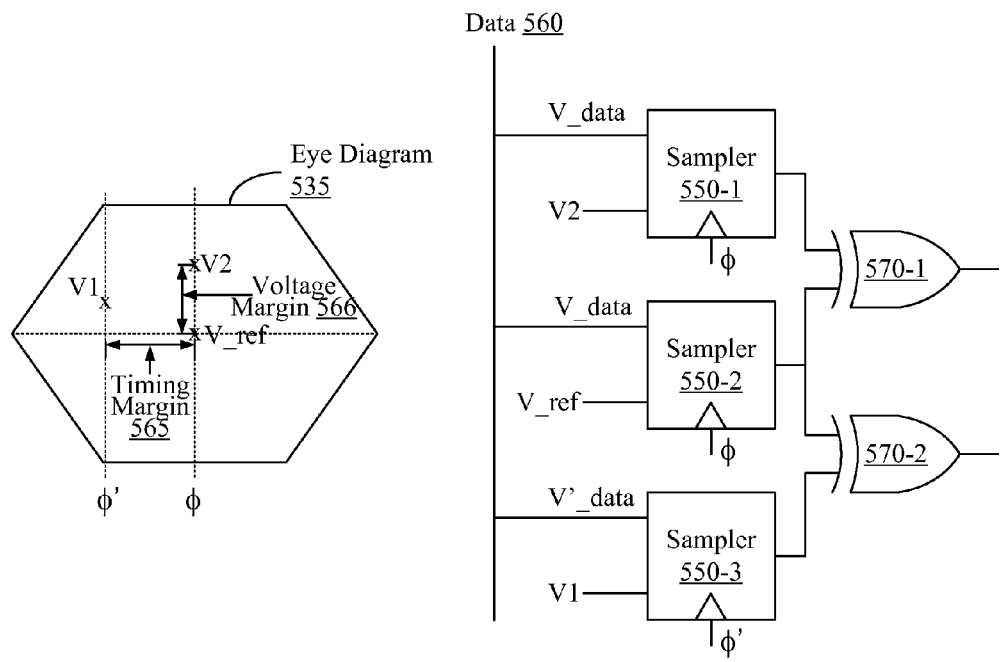
FIG. 5B is a block diagram illustrating an embodiment of measuring voltage and timing margins of an electronic device.
Figure 5C:
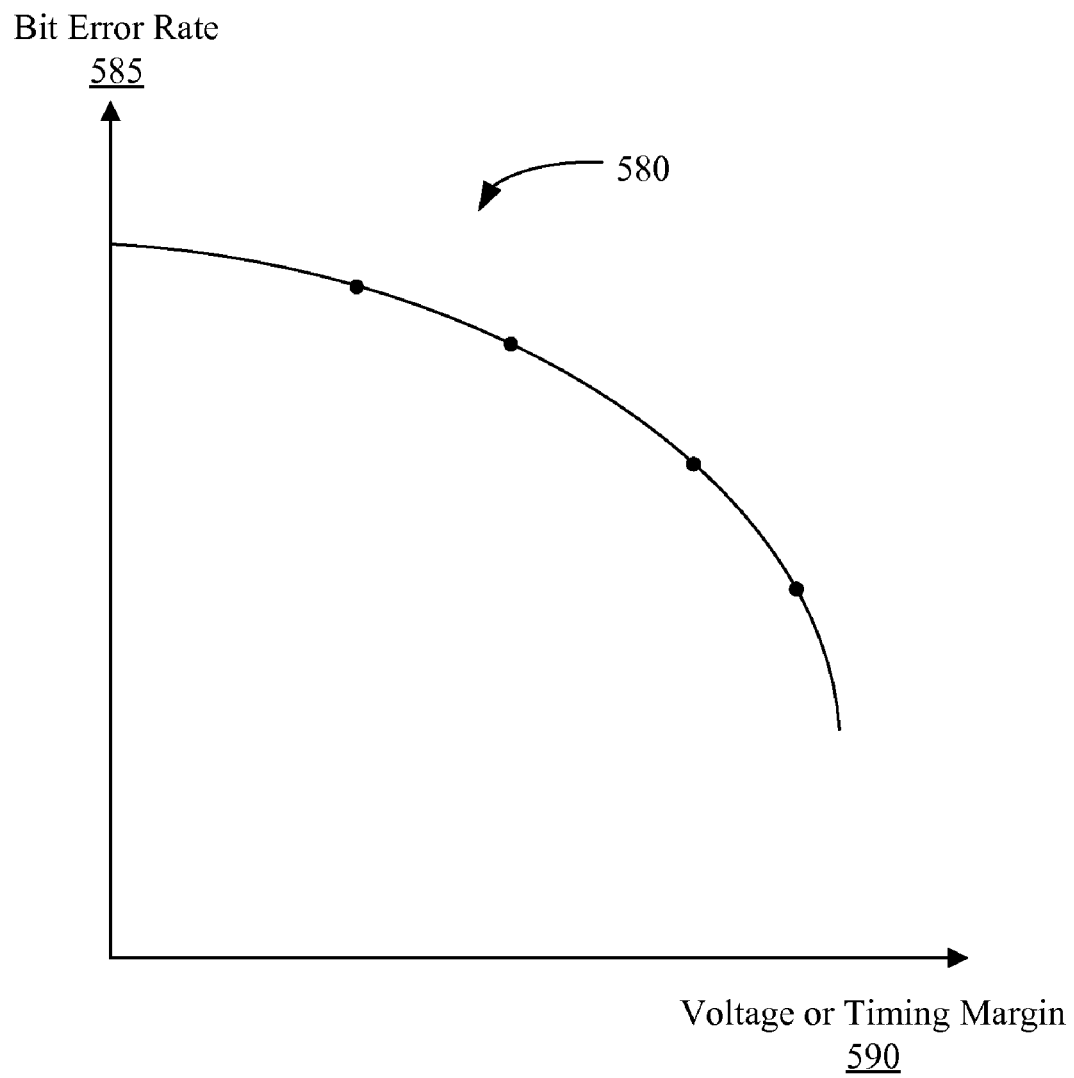
FIG. 5C illustrates an embodiment of a relationship between bit error rate and voltage or timing margin.

As noted above, an electronic device generates voltage control signals by measuring a performance metric and comparing it with a predefined threshold value. Exemplary performance metrics include voltage margin, timing margin, bit error rate, and critical path delay error. FIGS. 5A-5C illustrate embodiments of determining performance metrics for an electronic device.

FIG. 5A is a block diagram illustrating an embodiment of detecting a critical path delay error in an electronic device. For simplicity, a critical path within the electronic device includes combinational logic 520 coupled to a latch or flip-flop 510 at its input interface and a latch or flip-flop 515 at its output interface. Latches or flip-flops 510 and 515 are clocked by a clock signal CLK 525. The worst-case delay from the output of the first latch or flip-flop 510, through the combinational logic 520, and to the output of the second latch or flip-flop 520 (called the critical path delay) must be a predefined number of clock periods of the clock signal CLK 525. In some embodiments, this critical path delay is measured by a replica circuit 540 to avoid measurement of the critical path from interfering with operation of the actual circuit 510, 520, 515. The path delay of the replica circuit 540 (from input to output of the replica circuit 540) is substantially equal to the critical path delay 505 along the actual signal path. In some embodiments, the electronic device is part of a synchronous digital system.

In some embodiments, the replica circuit 540 transparently transfers an incoming signal to the output interface with a path delay substantially equal to the critical path delay 505. The clock CLK 525 is submitted to the replica circuit 540 as an input and the replica circuit 540 produces a similar clock waveform, but delayed by the delay of the replica circuit 540. With certain assumptions on the range of the replica circuit delay, the path delay of replica circuit can be compared against the time period of the clock CLK 525 by comparing the phases of CLK 525 and the output clock 545 of the replica circuit 505. For example, if the replica circuit delay is known to be less than 1.5 times the period of CLK 525, the replica circuit delay (which is substantially equal to the critical path delay 505) is said to be less than the clock period when the phase of output clock 545 is earlier than the input clock CLK 525 and vice versa. Similarly, if the replica circuit delay is known to be between 3.5 times and 4.5 times the period of CLK 525, a similar comparison can be made between the replica circuit delay and 4 times the period of CLK 525.

A phase detector 530 is coupled to the clocks 525 and 545 to determine the critical path delay 505 and to produce an Up/Down signal 532 in accordance with whether the critical path delay 505 is larger or smaller than an expected or default value. A difference between the critical path delay 505 and the predefined number of clock cycles corresponds to the critical path's delay error, which can be used to adjust voltage supplies to the electronic device 110 or 120, or both. For example, an increase of at least one voltage supply (e.g., caused by the phase detector 530 producing an Up signal on its output) may be required if the critical path delay 505 is longer than the predefined number of clock cycles. A decrease of at least one voltage supply (e.g., caused by the phase detector 530 producing a Down signal on its output) may help to reduce the discrepancy between the two if the critical path delay 505 is equal to or shorter than the predefined number of clock cycles.

In some embodiments, the aforementioned approach of determining the critical path delay 505 is often employed to monitor digital logic circuits within an electronic device because the time delay between two connected circuits has to be exact to avoid errors.

FIG. 5B is a block diagram illustrating an embodiment of measuring voltage and timing margins of an electronic device. Signal distortion is inevitable for virtually any signal path. An eye diagram (or eye pattern) 535 is often used to characterize signal distortion. To avoid or reduce data sampling errors, the eye diagram 535 has to satisfy requirements described by parameters such as timing margin 565, voltage margin 566, and bit error rate.

As shown in FIG. 5B, a reference threshold V_ref can be used to determine the value of a data sample V_data. For example, the data sample V_data is deemed to be "1" if its value is higher than the reference threshold V_ref and the data sample V_data is deemed to be "0" if its value is lower than the reference threshold V_ref. But a "1" data sample could be lower than the reference threshold and a "0" data sample could be higher than the reference threshold because of signal distortion, causing errors in the received data. To get an indication of the probability of such errors, a data sample is also compared with other reference thresholds.

For example, one sample V_data of the data signal 560 at a particular moment φ is stored in both the samplers 550-1 and

550-2. The data sample V_data at the sampler 550-2 is compared with the reference threshold V_ref and the same data sample V_data at the sampler 550-1 is compared with another reference threshold V2. The difference between the two reference thresholds is defined as "voltage margin" 566 of the eye diagram. The outputs of the two samplers are coupled to XOR logic 570-1. If the data sample V_data is higher than both the reference thresholds V_ref and V2, the output of the logic 570-1 is a logic zero, indicating that the data sample meets the voltage margin requirement. If the data sample V_data is higher than the reference threshold V_ref but lower than the reference threshold V2, the output of the logic 570-2 is a logic one, indicating that the receiver does not have enough voltage margin and is susceptible to error due to noise, distortion, or interference.

Similarly, a data sample V'_data of the data signal 560 at another moment $\phi'$ is stored in the sampler 550-3 and compared with another reference threshold V1. In some embodiments, V1 is equal to V_ref. The difference between $\phi'$ and the center of the eye diagram 535 is defined as "timing margin" of the eye diagram. The outputs of the two samplers are coupled to XOR logic 570-2. A sampling of the data signal 560 within the timing margin is deemed correct and a sampling of the data signal 560 outside the timing margin is deemed potentially incorrect and may require a re-sampling.

In some embodiments, a performance metric based on the voltage margin and/or timing margin is used to measure the corresponding electronic device's performance. For example, an increase of one or more voltage supplies to the electronic device or another device with which the electronic device communicates is required if the performance metric is lower than a predefined threshold value. If the performance metric is higher than the predefined threshold value, it is possible to decrease one or more voltage supplies to the electronic device or another device with which the electronic device communicates and therefore save power.

In some embodiments, the bit error rate is chosen as the performance metric of an electronic device. FIG. 5C is a prophetic illustration of a relationship between the bit error rate 585 and the voltage or timing margins 590. This relationship 580 may be used to predict voltage or timing margin at other values of the bit error rate 585. Alternatively, the relationship 580 may be used to predicted the bit error rate based on a measured voltage or timing margin at a given data sampling rate. In some embodiments, a close-formed expression or a look-up table that includes data representing the relationship 580 may be pre-installed in a storage device for subsequent use during voltage supply adjustment. In some embodiments, the bit error rate is measured directly by transmitting a known data pattern over a certain time period or by the use of error-detecting/correcting codes embedded in the data bit stream.

The measurements described above in connection with FIGS. 5A-5C cover different aspects of an electronic device's performance. They can generate separate voltage control signals as shown in FIG. 3 or be combined into one voltage control signal as shown in FIGS. 1 and 2.

Figure 6:
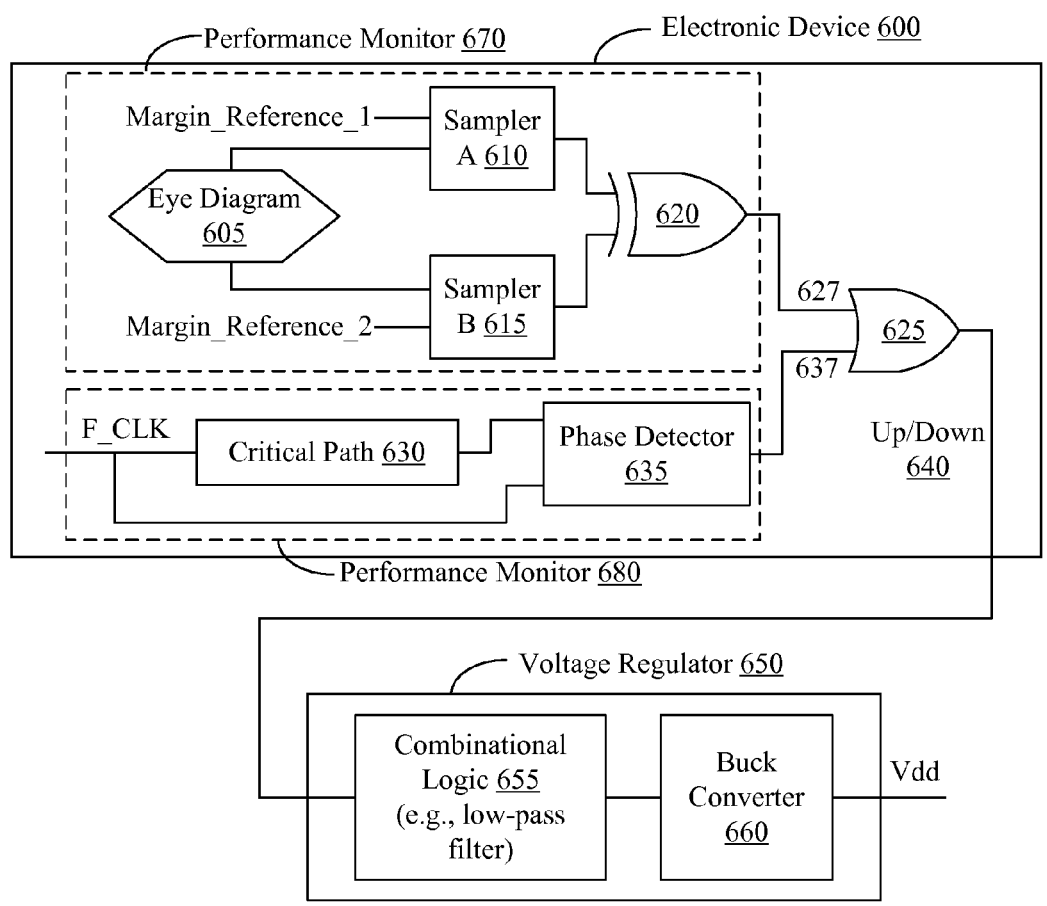
FIG. 6 is a block diagram illustrating an embodiment of circuitry that generates a combined voltage adjustment signal by measuring different performance metrics within an electronic device.

FIG. 6 is a block diagram illustrating an embodiment of an electronic device that generates a combined voltage adjustment signal by measuring different performance metrics within the electronic device. The electronic device 600 includes two performance monitors 670 and 680. In some embodiments, where an up adjustment signal is represented by logic 1 and a down adjustment signal is represented by logic 0, the outputs of the two performance monitors are coupled to the respective input terminals of an OR logic circuit 625, which produces a voltage up/down adjustment signal based on the two performance monitors' inputs. The voltage up/down adjustment signal is received by a voltage regulator 650 for updating one or more voltage supplies Vdd produced by the voltage regulator 650.

In some embodiments, the performance monitor 680 measures a critical path's delay error in a manner as described above in connection with FIG. 5A. The performance monitor 680 includes a replicated critical path 630 corresponding to an actual signal path in the device. A phase detector 635 detects a time delay along the critical path 630, compares the time delay with a predefined threshold value, and generates a voltage control signal 637 accordingly.

In some embodiments, the performance monitor 670 measures the voltage and/or timing margins of an eye diagram 605 in a manner as described above in connection with FIG. 5B. The eye diagram 605 is a performance characterization of the electronic device 600 or a subset thereof. The performance monitor 670 generates another voltage control signal 627 using an XOR logic circuit 620. The XOR logic circuit 620 has two input terminals, each input terminal coupled to a respective output terminal of the sampler A 610 and the sampler B 615.

The two voltage control signals 627 and 637 are input signals to the OR logic circuit 625. In some embodiments, the OR logic circuit 625 is configured to generate a voltage up control signal represented by logic 1 if at least one of the two control signals 627 and 637 is a voltage up control signal represented by logic 1 and generate a voltage down control signal represented by logic 0 if both the two control signals 627 and 637 are voltage down control signals represented by logic 0. By doing so, it is less likely for an electronic system including the electronic device 600 to miss its performance target.

The OR logic circuit 625 transmits the up/down voltage control signal 640 to the voltage regulator 650. The voltage regulator 650 includes a buck converter 660 for increasing/decreasing one or more voltage supplies it generates in accordance with the up/down voltage control signal 640. In some other embodiments, the voltage regulator 650 may use another type of voltage converter, such as a boost converter, buck-boost converter, charge-pump, or linear regulator.

In some embodiments, the voltage regulator 650 includes combinational logic 655. The combinational logic 655 is configured to stabilize the up/down voltage control signal 640. For example, a low-pass filter may be used here to take the average of the up/down voltage control signal 640 sampled within a predefined number of clock cycles to reduce the impact of abnormal output generated by the OR logic circuit 625. Other embodiments may incorporate additional logic into the voltage regulator 650 or eliminate some logic from the voltage regulator 650 to update the voltage supply Vdd.

A voltage supply to an electronic device cannot be decreased arbitrarily according to the aforementioned power saving scheme because of the threshold voltage at a MOSFET transistor level of the device. The threshold voltage of a MOSFET transistor can be defined as the gate voltage at which the transistor turns on and begins to conduct current between its source and drain. Alternately, the threshold voltage of a MOSFET transistor can be defined as the gate voltage at which a layer of inverted-charge carriers forms under the gate with the same density as the majority carriers in the substrate (body) of the transistor. If the gate voltage is below the threshold voltage, the transistor is turned off and ideally there is no current from the drain to the source of the transistor. If the gate voltage is larger than the threshold voltage, the transistor is turned on and a current can flow between the drain and the source of the transistor. Since the gate voltage at the transistor level depends on the voltage supply at the device level, a device cannot operate normally if the voltage supply to the device is so low that the gate voltage is less than the threshold voltage.

It is well-known that the threshold voltage of a transistor is not a constant, but a variable of multiple factors. For example, changes in the bulk (or substrate or back-gate bias) voltage affect the changes in the threshold voltage. If the bulk voltage varies with a voltage supply to a device, it is possible to establish a relationship between the threshold voltage at the transistor level and the voltage supply at the device level. In some embodiments, this relationship is used to further decrease the voltage supply without causing a transistor to function abnormally.

Figure 7A:
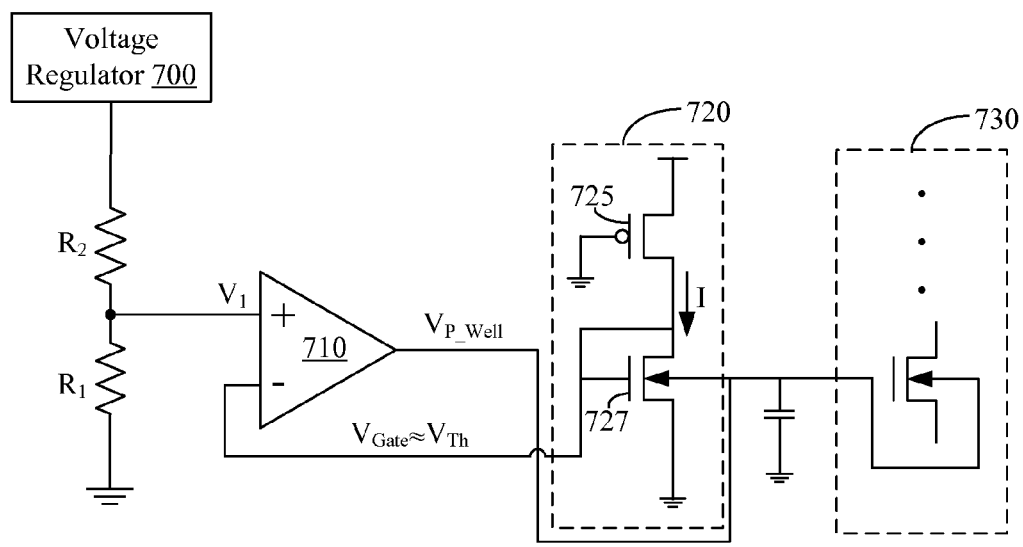
FIG. 7A is a block diagram illustrating an embodiment of an in-situ threshold voltage control using a voltage regulator.

FIG. 7A is a block diagram illustrating an embodiment of an in-situ threshold voltage control using a voltage regulator. Block 730 represents actual circuit components (e.g., transistors) fabricated on a semiconductor substrate as part of an electronic device. Block 720 represents a threshold voltage measurement circuit fabricated on the same substrate. The circuit components within the two blocks have the same or similar bulk voltage. In some embodiments, the threshold voltage measurement circuit is a replica of actual circuit components on the same substrate. The substrate or bulk is coupled to the output terminal of an amplifier 710 (e.g., an operational amplifier, sometimes called an "op amp"). The amplifier 710 has two input terminals, one from a voltage regulator 700 and the other from the threshold voltage measurement circuit.

In some embodiments, the threshold voltage measurement circuit includes a PMOS transistor 725 and an NMOS transistor 727. The two transistors 725 and 727 are serially connected. The PMOS transistor 725 is configured to be barely turned on and there is a small current I from its source to drain. The NMOS transistor 727 is diode-connected. Because of the small current I, the gate overdrive at the transistor 727 is small. As a result, the gate voltage $V_{Gate}$ of the transistor 727, which is coupled to one input terminal of the amplifier 710 to form a feedback loop, is very close to the transistor 727's threshold voltage $V_{Th}$.

In some embodiments, a linear circuit (e.g., a resistor divider shown in FIG. 7A) generates a fraction of the voltage supply from the voltage regulator 700 and feeds the fractional voltage supply to the amplifier 710. For example, as shown in FIG. 7A, the voltage supply $V_1$ at the other input terminal of the amplifier 710 is defined as $$V_1 = \frac{R_1}{R_1 + R_2} V,$$

where V is the voltage supply at the voltage regulator 700. The voltage difference at the two input terminals of the amplifier 710 is used for adjusting the bulk voltage $V_{P\_Well}$, which, in turn, affects the threshold voltage such that it always tracks the voltage supply V of the voltage regulator 700, i.e., $V_{Th} \approx V_1$. When the voltage regulator 700 increases/decreases the voltage supply V in accordance with a performance metric, the threshold voltage $V_{Th}$ is adjusted accordingly at the same scale. This circuit configuration reduces the likelihood of a transistor-level malfunction to occur due to a decrease in voltage supply. Advantageously, this type of in-situ threshold control mechanism can substantially enhance the performance of an analog device or the analog portion of an electronic device.

Figure 7B:
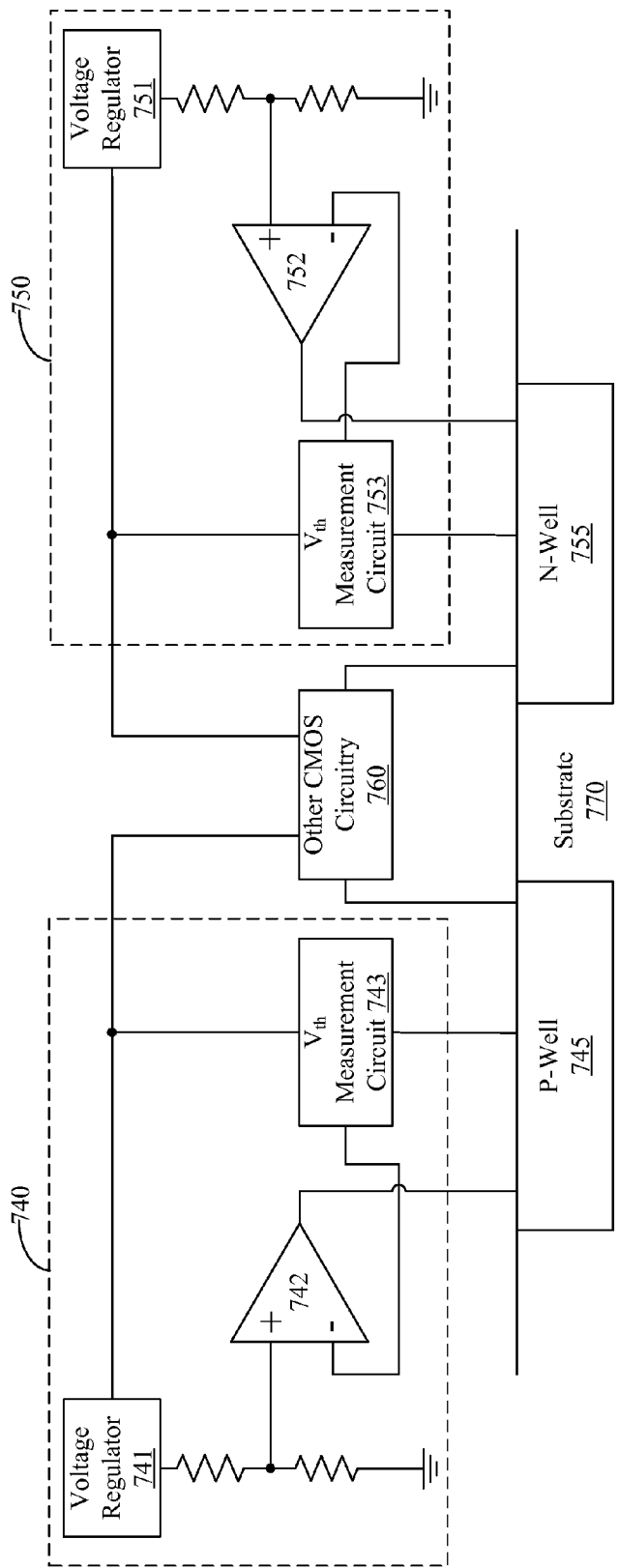
FIG. 7B is a block diagram illustrating an embodiment of two voltage regulators in-situ modulating transistor threshold voltages by modulating P-well and N-well voltages.

In some embodiments, different voltage regulators are configured to control the threshold voltages at different portions of a substrate. FIG. 7B is a block diagram illustrating an embodiment of two voltage regulators 741, 751 in-situ modulating the threshold voltages of P-well 745 and N-well 755 of a substrate 770.

The circuit 740 adjusts the threshold voltage of NMOS transistors having back bias nodes in the P-Well 745 in response to a voltage supply update at the voltage regulator 741. A threshold voltage measurement circuit 743 includes a replica of circuit components in the other CMOS circuitry 760 such as one or more NMOS transistors having their back bias nodes in the P-Well 745 of the substrate 770. An operational amplifier 742 has two input terminals, one coupled to the voltage regulator 741 via a resistor divider and the other coupled to an output of the threshold voltage measurement circuit 743, and an output coupled to the P-Well 745. The operational amplifier 742 adjusts the voltage level of the P-Well 745 in accordance with the difference between its two inputs. The circuit 750 adjusts the threshold voltage of PMOS transistors having back bias nodes in the N-Well 755 in response to a voltage supply update at the voltage regulator 751. A threshold voltage measurement circuit 753 includes a replica of circuit components in the other CMOS circuitry 760 such as one or more PMOS transistors having their back bias nodes in the N-Well 755 of the substrate 770. An operational amplifier 752 has two input terminals, one coupled to the voltage regulator 751 via a resistor divider and the other coupled to an output of the threshold voltage measurement circuit 743, and an output coupled to the N-Well 755. The operational amplifier 752 adjusts the voltage level of the P-Well 755 in accordance with the difference between its two inputs. The operations of the two circuits 740, 750 are similar to what is described above in connection with FIG. 7A.

In some embodiments, a voltage regulator is not inside a package together with other electronic devices. Rather, it is mounted on an external surface of the package to adjust external voltage supplies to the package.

FIGS. 8A-8C are block diagrams illustrating different views 810, 820, 830 of an embodiment of two voltage regulators 825 mounted on the bottom surface of an electronic package. The voltage regulators 825 may receive performance metric measurement signals from electronic devices both within the package and external to the package. The devices 815 within the package may be fabricated on one or more dies. Based on the measurement signals, the voltage regulators 825 adjust one or more voltage supplies to the devices within the package. In some embodiments, as shown in FIG. 4, at least one of the voltage regulators 825 may be integrated into one of the electronic devices 815 within the package. It will be apparent to one skilled in the art that voltage adjustment schemes described above are applicable to the external voltage regulators 825.

The aforementioned voltage adjustment schemes can be further generalized to optimize multiple voltage supplies to an electronic system beyond what is described above.

Figure 9A:
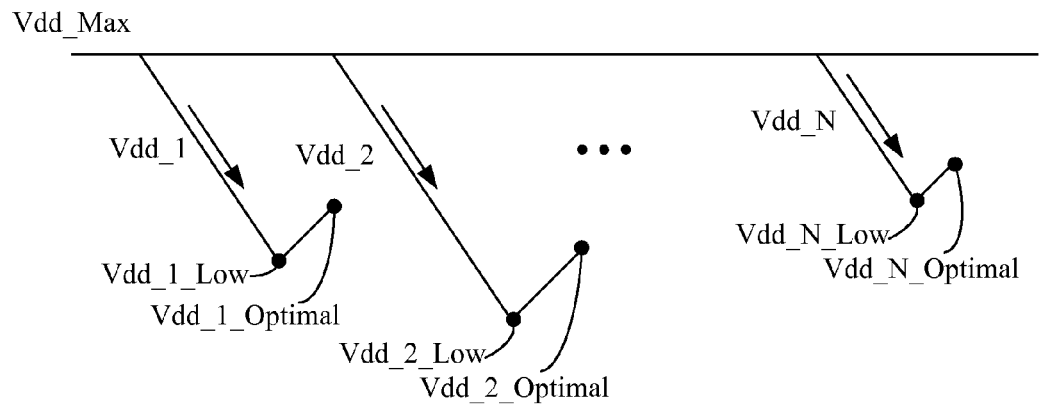
FIG. 9A illustrates an embodiment of a one-dimensional method for optimizing multiple voltage supplies to an electronic system.

FIG. 9A illustrates an embodiment of a one-dimensional method for optimizing multiple voltage supplies to an electronic system.

Initially, all the voltage supplies to the system are set to be Vdd_Max. In some embodiments, Vdd_Max is a high voltage that satisfies the system's performance requirements under the worst scenario.

Next, a first voltage supply Vdd_1 of the multiple voltage supplies is decreased at a predefined scale repeatedly and monotonically until a first performance metric of the electronic system fails a first predefined requirement when the first voltage supply reaches a level of Vdd_1_Low. The first voltage supply Vdd_1 is then rolled back to a level of Vdd_1_Optimal, at which level the first performance metric meets the first predefined requirement.

Next, a second voltage supply Vdd_2 of the multiple voltage supplies is decreased at a predefined scale repeatedly and monotonically until a second performance metric of the electronic system fails a second predefined requirement when the second voltage supply reaches a level of Vdd_2_Low. The second voltage supply Vdd_2 is then rolled back to a level of Vdd_2_Optimal, at which level the second performance metric meets the second predefined requirement. In some embodiments, while the second voltage supply Vdd_2 is being adjusted, the first voltage supply Vdd_1 is maintained at the level Vdd_1_Optimal established by the first rolling back operation.

As shown in FIG. 9A, the aforementioned procedure is repeatedly invoked for each of the multiple voltage supplies to the electronic system. In the end, each of the voltage supplies is locked to a respective optimal value such that the entire system operates in a power-efficient mode.

In some embodiments, the second performance metric is the same as the first performance metric. In some other embodiments, the second performance metric is different from the first performance metric. For example, the first voltage supply may be Vdd_IO, i.e., the voltage supply to the digital circuitry in the system. In this case, the first performance metric is chosen as the critical path delay error of the digital circuitry or a subset thereof. Similarly, if the second voltage supply is Vdd_Analog, i.e., the voltage supply to the analog circuitry in the system, the voltage/time margin or bit error rate is probably a better choice for the second performance metric.

In some embodiments, either performance metric is selected from the group consisting of voltage margin, timing margin, bit error rate, critical path delay error, and one or more functions thereof.

In some embodiments, while a third voltage supply is being adjusted, the first and second voltage supplies are maintained at the levels established by the first and second rolling back operations mentioned above.

In some embodiments, the multiple voltage supplies include at least two distinct voltage supplies selected from the set consisting of a receive circuitry voltage supply, transmit circuitry voltage supply, an input/output circuitry voltage supply, a digital circuit voltage supply, and an analog circuitry voltage supply.

Figure 9B:
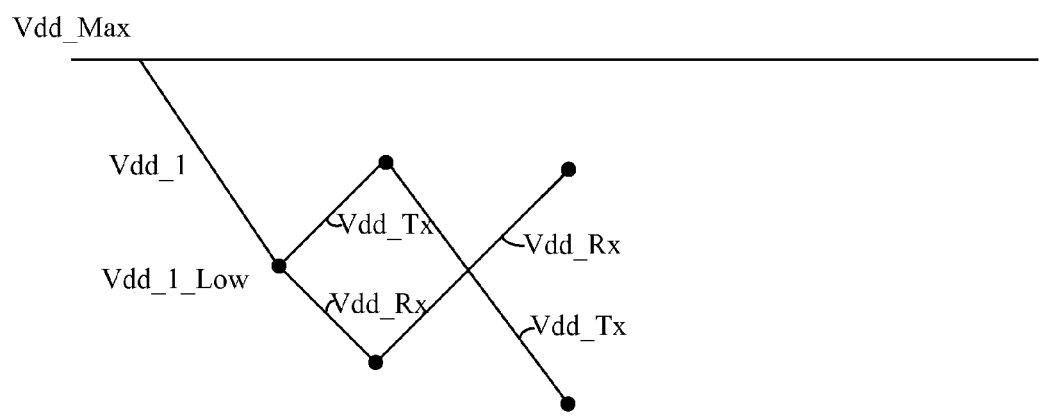
FIG. 9B illustrates an embodiment of a multi-dimensional method for optimizing multiple voltage supplies to an electronic system.

FIG. 9B illustrates an embodiment of a multi-dimensional method for optimizing multiple voltage supplies to an electronic system.

Initially, a respective voltage is assigned to each of the multiple voltage supplies. For example, all the voltage supplies are set to be a voltage level of Vdd_Max that satisfies the system's performance requirements under the worst scenario. Next, at least two of the multiple voltage supplies are adjusted repeatedly to produce multiple sets of voltage supplies. In some embodiments, a voltage supply is adjusted by a predefined step. In some embodiments, the two respective voltage supplies are adjusted in opposite directions. For example, as shown in FIG. 9B, the voltage supply Vdd_Tx is increased and the voltage supply Vdd_Rx is decreased at certain moments. At other moments, the voltage supply Vdd_Tx is decreased and the voltage supply Vdd_Rx is increased.

Each set of voltage supplies is further examined to determine if it satisfies a predefined requirement with respect to a first performance metric of the electronic system. Finally, a set of voltage supplies that satisfy the predefined requirement is chosen for operating the electronic system accordingly. If there may be at least two sets of voltage supplies satisfying the predefined requirement, a selection function is used for choosing one set of voltage supplies among the two or more sets of voltage supplies that satisfy the predefined requirement.

In some embodiments, the selection function corresponds to power consumption by one device within the electronic system. In some other embodiments, the selection function includes a weighted function of the voltage supplies in each set of voltage supplies. In some embodiments, the first performance metric is selected from the group consisting of voltage margin, timing margin, bit error rate, critical path delay error, and one or more functions thereof.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of adjusting a voltage supplied to a first electronic device, said first electronic device coupled to a second electronic device via a wired communication link, comprising:
   determining a performance metric of the first electronic device in accordance with signals received by the first electronic device from the second electronic device via the wired communication link;
   comparing the performance metric with a first threshold value and comparing the performance metric with a second threshold value;
   increasing the voltage if the performance metric differs from the first threshold value in a first direction; and
   decreasing the voltage if the performance metric differs from the second threshold value in a second direction that is opposite to the first direction.

2. The method of claim 1, further comprising repeating said comparing and increasing until the performance metric matches the first threshold value.

3. The method of claim 1, further comprising repeating said comparing and decreasing until the performance metric matches the second threshold value.

4. The method of claim 1, wherein the performance metric is selected from a group consisting of voltage margin, timing margin, bit error rate, and one or more functions thereof.

5. The method of claim 1, wherein the voltage is adjusted in accordance with the performance metric when the first electronic device operates in an initialization mode.

6. The method of claim 1, wherein the voltage is adjusted in accordance with a temperature of the first electronic device when the first electronic device operates in a post-initialization mode.

7. An electronic system, comprising:
   a first electronic device;
   a second electronic device;
   one or more wired communication links coupling the first electronic device to the second electronic device; and
   a voltage regulator operative to provide a voltage to the first electronic device, wherein the voltage regulator is configured to:

determine a performance metric in accordance with signals received by the first electronic device from the second electronic device via the one or more wired communication links;

compare the performance metric with a first threshold value and compare the performance metric with a second threshold value;

increase the voltage if the performance metric differs from the first threshold value in a first direction; and decrease the voltage if the performance metric differs from the second threshold value in a second direction that is opposite to the first direction.

8. The system of claim 7, wherein the voltage regulator is configured to
repeat said compare and increase operations until the performance metric matches the first threshold value.

9. The system of claim 7, wherein the voltage regulator is further configured to
repeat said compare and decrease operations until the performance metric matches the second threshold value.

10. The system of claim 7, wherein the performance metric is selected from a group consisting of voltage margin, timing margin, bit error rate, and one or more functions thereof.

11. The system of claim 7, wherein the voltage is adjusted in accordance with the performance metric when the first or second electronic device operates in an initialization mode.

12. The system of claim 7, wherein the voltage is adjusted in accordance with a temperature of the first or second electronic device when the first or second electronic device operates in a post-initialization mode.

13. A multiple-die electronic package, comprising:
a first die;
a second die;
one or more wired communication links coupling the first die to the second die; and
a voltage regulator coupled to the first and second dies to provide a first voltage to the first die but not the second die, and to provide a second voltage to the second die, wherein the voltage regulator is configured to adjust the first voltage in accordance with a voltage-adjustment signal from the second die, wherein the voltage-adjustment signal is at least in part dependent on signals received by the second die from the first die via the one or more wired communication links.

14. The electronic package of claim 13, wherein the voltage regulator is coupled to a substantially constant-voltage power supply.

15. The electronic package of claim 13, wherein the second die includes first logic configured to generate a first sub-signal for a first type of circuit in the second die and second logic configured to generate a second sub-signal for a second type of circuit in the second die, and wherein the voltage-adjustment signal is a function of the first and second sub-signals.

16. The electronic package of claim 15, wherein the voltage-adjustment signal is a voltage-increasing signal if any of the first and second sub-signals is a voltage-increasing signal.

17. The electronic package of claim 15, wherein the voltage-adjustment signal is a voltage-decreasing signal if the first and second sub-signals are both voltage-decreasing signals.

18. The electronic package of claim 15, wherein the second logic is configured to generate a voltage-increasing signal if the second die has a voltage margin below a predefined voltage margin threshold.

19. The electronic package of claim 15, wherein the second logic is configured to generate a voltage-increasing signal if the second die has a timing margin below a predefined timing margin threshold.

20. The electronic package of claim 15, wherein the second logic is configured to generate a voltage-increasing signal if the second die has a bit error rate above a predefined bit error rate threshold.

21. The electronic package of claim 15, further including a housing, the housing having an external surface, and wherein the first die and the second die are mounted inside the housing and the voltage regulator is mounted on the external surface.

22. The electronic package of claim 13, further including a housing and wherein the first die and the second die are mounted inside the housing, and the voltage regulator is mounted on the second die, inside the housing.

23. A multiple-die electronic package, comprising:
a first die;
a second die;
one or more wired communication links coupling the first die to the second die; and
a voltage regulator coupled to the first die to supply a first voltage and coupled to the second die to provide a second voltage but not the first voltage, wherein the voltage regulator is configured to adjust the first voltage in accordance with a voltage-adjustment signal from the second die, wherein the voltage-adjustment signal is at least in part dependent on signals received by the second die from the first die via the one or more wired communication links.

24. The multiple-die electronic package of claim 23, further including a housing, the housing having an external surface, wherein the first die and second die are mounted inside the housing, and the voltage regulator is mounted on the external surface.

25. The multiple-die electronic package of claim 23, further including a housing, the housing having an external surface, wherein the first die and second die are mounted inside the housing, and the voltage regulator is mounted on the second die, inside the housing.

26. The multiple-die electronic package of claim 23, wherein the voltage regulator is integrated into one of the first die and the second die.

* * * * *